US008473603B2

(12) United States Patent
Diao et al.

(10) Patent No.: US 8,473,603 B2
(45) Date of Patent: Jun. 25, 2013

(54) CROSS-TIER MANAGEMENT IN MULTI-TIER COMPUTING SYSTEM ARCHITECTURE

(75) Inventors: Yixin Diao, White Plains, NY (US); Hidayatullah Habeebullah Shaikh, Mohegan Lake, NY (US); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/119,828

(22) Filed: May 13, 2008

(65) Prior Publication Data
US 2008/0215729 A1 Sep. 4, 2008

Related U.S. Application Data

(63) Continuation of application No. 11/479,511, filed on Jun. 30, 2006, now abandoned.

(51) Int. Cl.
*G06F 15/173* (2006.01)
(52) U.S. Cl.
USPC .......................................... 709/224; 709/223
(58) Field of Classification Search
USPC .................................. 709/223–226
See application file for complete search history.

(56) References Cited

U.S. PATENT DOCUMENTS

| 6,253,228 | B1 * | 6/2001 | Ferris et al. | 709/203 |
|---|---|---|---|---|
| 6,377,993 | B1 * | 4/2002 | Brandt et al. | 709/227 |
| 6,845,397 | B1 * | 1/2005 | Lavian et al. | 709/230 |
| 6,859,882 | B2 * | 2/2005 | Fung | 713/300 |
| 6,950,848 | B1 * | 9/2005 | Yousefi'zadeh | 709/203 |
| 6,976,054 | B1 * | 12/2005 | Lavian et al. | 709/203 |
| 7,032,119 | B2 * | 4/2006 | Fung | 713/320 |
| 7,058,826 | B2 * | 6/2006 | Fung | 713/300 |
| 7,134,011 | B2 * | 11/2006 | Fung | 713/100 |
| 7,143,153 | B1 * | 11/2006 | Black et al. | 709/223 |
| 7,194,664 | B1 * | 3/2007 | Fung et al. | 714/45 |
| 7,212,574 | B2 * | 5/2007 | Abrams et al. | 375/240.25 |
| 7,237,129 | B2 * | 6/2007 | Fung | 713/323 |
| 7,272,735 | B2 * | 9/2007 | Fung | 713/320 |
| 7,484,111 | B2 * | 1/2009 | Fung | 713/320 |
| 7,512,822 | B2 * | 3/2009 | Fung | 713/323 |
| 7,533,283 | B2 * | 5/2009 | Fung | 713/322 |

(Continued)

OTHER PUBLICATIONS

"Class-Based Kernel Resource Management," http://ckrm.sourceforge.net/, 2006, pp. 1-3.

(Continued)

*Primary Examiner* — Yasin Barqadle
*Assistant Examiner* — Marcus McKenzie
(74) *Attorney, Agent, or Firm* — Louis J. Percello; Ryan, Mason & Lewis, LLP

(57) ABSTRACT

Techniques are disclosed for providing cross-tier management in a multi-tier computing system architecture. For example, a method for managing a computing system, wherein the computing system includes a first tier and at least a second tier, wherein the first tier and the second tier are configured to respond to a request received by the computing system, includes the steps of monitoring performance of the second tier from the first tier, and sending one or more management commands from the first tier to the second tier based on the monitored performance. In one embodiment, the first tier may be an application server tier of the computing system, and the second tier may be a database server tier of the computing system.

19 Claims, 4 Drawing Sheets

U.S. PATENT DOCUMENTS

| | | | |
|---|---|---|---|
| 7,552,350 B2* | 6/2009 | Fung | 713/320 |
| 7,558,858 B1* | 7/2009 | Eslambolchi et al. | 709/226 |
| 7,558,976 B2* | 7/2009 | Fung | 713/320 |
| 7,562,239 B2* | 7/2009 | Fung | 713/320 |
| RE40,866 E* | 8/2009 | Fung | 713/300 |
| 7,702,739 B1* | 4/2010 | Cheng et al. | 709/207 |
| 7,822,967 B2* | 10/2010 | Fung | 713/100 |
| 8,074,092 B2* | 12/2011 | Fung | 713/300 |
| 2001/0037374 A1* | 11/2001 | Shrum et al. | 709/217 |
| 2002/0004912 A1* | 1/2002 | Fung | 713/300 |
| 2002/0004913 A1* | 1/2002 | Fung | 713/300 |
| 2002/0004915 A1* | 1/2002 | Fung | 713/320 |
| 2002/0007464 A1* | 1/2002 | Fung | 713/320 |
| 2002/0052941 A1* | 5/2002 | Patterson | 709/223 |
| 2002/0062454 A1* | 5/2002 | Fung | 713/300 |
| 2002/0073189 A1* | 6/2002 | Koontz et al. | 709/223 |
| 2002/0083170 A1* | 6/2002 | Collazo | 709/224 |
| 2002/0174214 A1* | 11/2002 | Carl et al. | 709/224 |
| 2003/0023505 A1* | 1/2003 | Eglen et al. | 705/26 |
| 2003/0078960 A1* | 4/2003 | Murren et al. | 709/203 |
| 2003/0172362 A1* | 9/2003 | Mack-Crane et al. | 716/12 |
| 2003/0188208 A1* | 10/2003 | Fung | 713/320 |
| 2003/0200473 A1* | 10/2003 | Fung | 713/320 |
| 2003/0208638 A1* | 11/2003 | Abrams et al. | 709/328 |
| 2003/0229623 A1* | 12/2003 | Chang et al. | 707/3 |
| 2004/0015600 A1* | 1/2004 | Tiwary et al. | 709/234 |
| 2004/0030739 A1* | 2/2004 | Yousefi'zadeh | 709/201 |
| 2005/0021742 A1* | 1/2005 | Yemini et al. | 709/224 |
| 2005/0021754 A1* | 1/2005 | Alda et al. | 709/225 |
| 2005/0049901 A1 | 3/2005 | Diao et al. | |
| 2005/0086645 A1 | 4/2005 | Diao et al. | |
| 2005/0108582 A1* | 5/2005 | Fung | 713/300 |
| 2005/0172161 A1* | 8/2005 | Cruz et al. | 714/4 |
| 2005/0182843 A1* | 8/2005 | Reistad et al. | 709/230 |
| 2005/0268063 A1 | 12/2005 | Diao et al. | |
| 2005/0273643 A1 | 12/2005 | Carroll et al. | |
| 2005/0278381 A1 | 12/2005 | Diao et al. | |
| 2005/0283539 A1* | 12/2005 | Betts et al. | 709/245 |
| 2006/0015512 A1* | 1/2006 | Alon et al. | 707/100 |
| 2006/0210051 A1* | 9/2006 | Tomisawa | 379/265.02 |
| 2006/0248324 A1* | 11/2006 | Fung | 713/1 |
| 2006/0248325 A1* | 11/2006 | Fung | 713/1 |
| 2006/0248358 A1* | 11/2006 | Fung | 713/300 |
| 2006/0248359 A1* | 11/2006 | Fung | 713/300 |
| 2006/0248360 A1* | 11/2006 | Fung | 713/300 |
| 2006/0248361 A1* | 11/2006 | Fung | 713/300 |
| 2006/0253717 A1* | 11/2006 | Fung | 713/300 |
| 2006/0259797 A1* | 11/2006 | Fung | 713/300 |
| 2006/0265608 A1* | 11/2006 | Fung | 713/300 |
| 2006/0265609 A1* | 11/2006 | Fung | 713/300 |
| 2006/0277606 A1* | 12/2006 | Yunus et al. | 726/25 |
| 2007/0101173 A1* | 5/2007 | Fung | 713/300 |
| 2007/0240006 A1* | 10/2007 | Fung | 713/323 |
| 2007/0245165 A1* | 10/2007 | Fung | 713/320 |
| 2007/0282988 A1* | 12/2007 | Bornhoevd et al. | 709/223 |
| 2008/0097961 A1* | 4/2008 | Dias et al. | 707/2 |
| 2008/0215729 A1* | 9/2008 | Diao et al. | 709/224 |
| 2009/0006445 A1* | 1/2009 | Shemenzon et al. | 707/102 |
| 2009/0144568 A1* | 6/2009 | Fung | 713/300 |

OTHER PUBLICATIONS

"AIX 5L Workload Manager (WLM)," IBM, Redbooks, International Technical Support Organization, www.redbooks.ibm.com/abstracts/sg245977.html, Jun. 2001, 354 pages.

A. Dave et al., "IBM eServer® i5 and iSeries™ Logical Partitioning FAQs," IBM, http://www-03.ibm.com/servers/eserver/iseries/lpar/, Jun. 2004, pp. 1-12, Version 1.00.

"Linux: Xen 2.0 Released," KernelTrap.org, http://kerneltrap.org/node/4168, Nov. 2004, pp. 1-3.

D.A. Menascé et al., "Preserving QoS of E-Commerce Sites Through Self-Tuning: A Performance Model Approach," Proceedings of the ACM Conference Electronic Commerce, Oct. 2001, 11 pages., Florida.

B. Urgaonkar et al., "Dynamic Provisioning of Multi-Tier Internet Applications," Proceedings of the 2nd IEEE International Conference on Autonomic Computing (ICAC-05), 2005, pp. 1-12.

Y. Diao et al., "Incorporating Cost of Control Into the Design of a Load Balancing Controller," Proceedings of IEEE Real-Time and Embedded Technology and Application Systems Symposium, May 2004, pp. 376-387, Canada.

Y. Diao et al., "Using MIMO Linear Control for Load Balancing in Computing Systems," Proceedings of the American Control Conference, Jun. 2004, pp. 2045-2050, Boston.

Y. Diao et al., "Comparative Studies of Load Balancing with Control and Optimization Techniques," Proceedings of American Control Conference, Jun. 2005, pp. 1484-1490, Oregon.

* cited by examiner

CROSS-TIER MANAGEMENT IN MULTI-TIER COMPUTING SYSTEM ARCHITECTURE

CROSS-REFERENCE TO RELATED APPLICATION(S)

This application is a continuation of U.S. application Ser. No. 11/479,511 filed on Jun. 30, 2006, the disclosure of which is incorporated herein by reference.

FIELD OF THE INVENTION

The present invention relates to computing systems, and, more particularly, to techniques for management of such computing systems.

BACKGROUND OF THE INVENTION

Most Internet service sites such as electronic commerce (e-commerce) web sites have a multi-tier computing system architecture that partitions the processing of web requests into tiers or stages. Such a multi-tier architecture may, for example, include an edge server stage, an Hypertext Transport Protocol (HTTP) server stage, an application server stage, and a database server stage.

Management systems are typically used to monitor the performance of the computing system and to cause actions to be taken to address performance problems. However, existing management solutions employ only a one-tier management approach. For example, an existing management system provides for dynamic capacity provisioning of the application server tier. However, such an approach does not take into account more than one tier of a multi-tier architecture, nor does it take into account interaction between tiers such as between the application server tier and some other tier.

By way of example, a resource bottleneck can exist in a backend tier such as the database tier. However, since the existing management system employs the one-tier management approach, interaction between the application server tier and the database server tier is not considered. Further, as a result, there is no ability provided by existing management techniques to manage one tier from another tier.

Accordingly, it would be desirable to provide a management approach that is able to take into account multiple tiers of a computing system architecture, and interactions there between, by managing one or more tiers of the computing system from one or more other tiers of the computing system.

SUMMARY OF THE INVENTION

Principles of the invention provide a management approach that is able to take into account multiple tiers of a computing system architecture, and interactions there between, by managing one or more tiers of the computing system from one or more other tiers of the computing system (i.e., provide cross-tier management).

For example, in one aspect of the invention, a method for managing a computing system, wherein the computing system includes a first tier and at least a second tier, wherein the first tier and the second tier are configured to respond to a request received by the computing system, includes the steps of monitoring performance of the second tier from the first tier, and sending one or more management commands from the first tier to the second tier based on the monitored performance.

The first tier may be an application server tier of the computing system, and the second tier may be a database server tier of the computing system.

The second tier may include a node agent for receiving the one or more management commands such that management control in the first tier extends to the second tier. The second tier may include an interface for abstracting the one or more management commands with respect to one or more provider-specific database management plug-in modules. The first tier and the second tier may implement a management model including a manageability extension layer, a manageability abstraction layer and a managed resource layer.

In a second aspect of the invention, a method for managing a computing system, wherein the computing system includes a first tier and at least a second tier, wherein the first tier and the second tier are configured to respond to a request received by the computing system, includes the steps of sending performance data from the second tier to the first tier, and receiving one or more management commands from the first tier at the second tier based on the monitored performance.

In a third aspect of the invention, apparatus for managing a computing system, wherein the computing system includes a first tier and at least a second tier, wherein the first tier and the second tier are configured to respond to a request received by the computing system, comprises: a node agent at the second tier configured to: (i) send performance data from the second tier to the first tier; and (ii) receive one or more management commands from the first tier at the second tier based on the monitored performance; and an interface at the second tier configured to abstract the one or more management commands with respect to one or more provider-specific database management plug-in modules.

In a fourth aspect of the invention, a method for managing one or more goals in a system that includes two or more tiers, whereby work progressively flows from tier-to-tier of the system, includes the steps of communicating one or more directives from a higher-level tier to a lower-level tier, and converting the one or more directives at the lower-level tier into instructions executable by a management component specific to the lower-level tier so as to effect the one or more system goals.

For example, work may progressively flow from a first tier to a second tier and subsequently from the second tier to at least a third tier. Accordingly, the communicating step and the converting step may further include communicating one or more directives from the first tier to the second tier, converting the one or more directives at the second tier into instructions executable by a management component specific to the second tier, communicating one or more directives from the second tier to the third tier, and converting the one or more directives at the third tier into instructions executable by a management component specific to the third tier.

In a fifth aspect of the invention, a system for providing cross-tier management of resources in a computer system includes the following layers. A manageability extension layer includes node agent code on a managed resource tier for receiving one or more control and configuration commands for the managed resource from an application server tier. A manageability abstraction layer includes code for interacting with a management interface and thereby defining a service provider interface for abstracting the one or more control and configuration commands. A managed resource layer includes resource-specific code for controlling a managed resource within the managed resource layer.

Advantageously, management principles of the invention may consider interaction between different tiers of the computing system architecture. Furthermore, principles of the invention may also provide the ability to change resource configurations across multiple tiers.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that the present invention is not limited to any particular multi-tier computing system architecture. Rather, the invention is more generally applicable to any multi-tier computing system architecture in which it would be desirable to provide a management approach that is able to manage one or more tiers of the computing system from one or more other tiers of the computing system.

Before describing management techniques of the invention, we provide a general description of an illustrative multi-tier computing system architecture.

Figure 1:
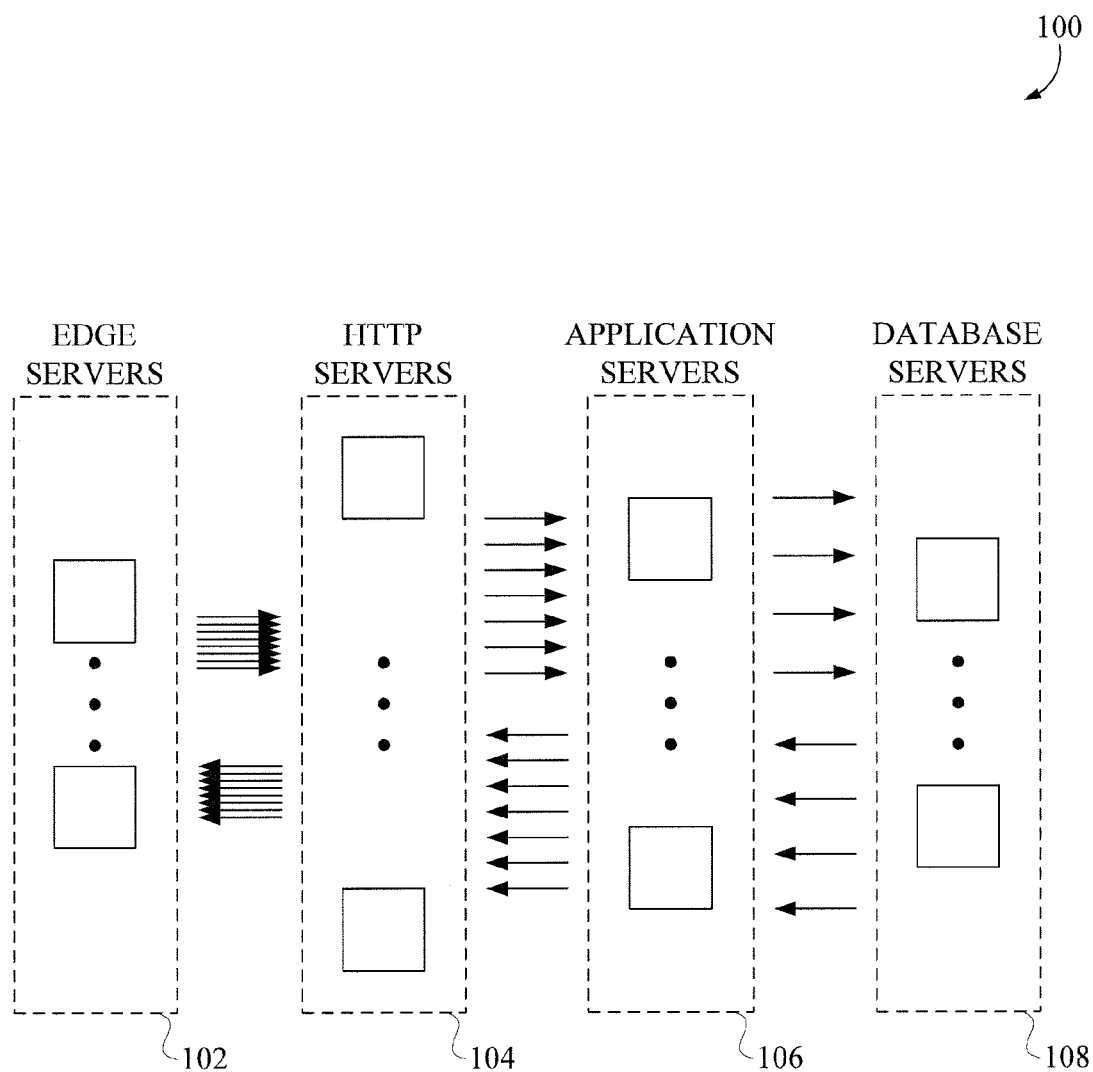
FIG. 1 illustrates a multi-tier computing system architecture in which cross-tier management techniques may be implemented, according to an embodiment of the invention.

FIG. 1 depicts such a multi-tier computing system architecture. Each tier comprises one or more nodes (e.g., hardware entities) that are dedicated to a specific kind of processing. In architecture 100 depicted in FIG. 1, the first tier or edge server tier 102 provides load balancing and request routing. The second tier or HTTP server tier 104 performs HTTP parsing and response generation. The third tier 106 contains application servers typically providing a Java 2 Platform Enterprise Edition (J2EE) for business logic (e.g., the software used to execute the particular e-commerce application). The fourth tier 108 contains database server nodes that manage persistent data. The architecture may include a fifth tier (not shown) as well, if a separate storage system is used (e.g., a storage area network).

In general, client requests enter the first tier and are routed to an HTTP server. Some fractions of the HTTP requests also require processing by application servers. A fraction of the requests processed by application servers also require services from a database server. Because inter-tier interaction is synchronous, threads/processes in upstream tiers are blocked while waiting for the completion of processing in downstream tiers. Thus, requests may simultaneously consume resources in the HTTP, application, and database server nodes. After processing by some or all of the tiers of the multi-tier computing system, a response to the request is sent to the client.

Principles of the invention provide techniques for enabling cross-tier management of resources in a multi-tier computing system. It is to be understood that principles of the invention identify a managed tier (e.g., database tier 108 in FIG. 1) and a managing tier (e.g., application server tier 106 in FIG. 1).

Figure 2A:
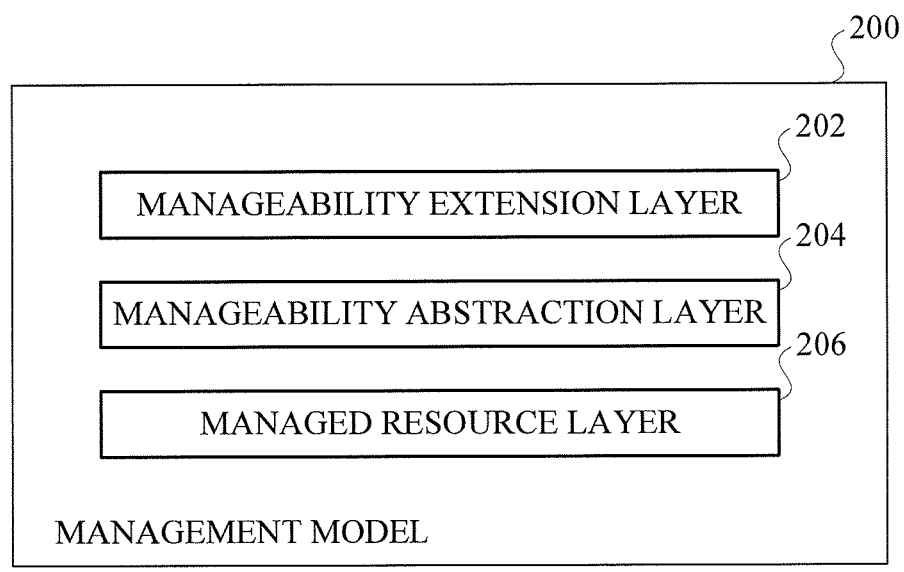
FIG. 2A illustrates a cross-tier management model, according to an embodiment of the invention.

Management techniques of the invention employ a multi-layer management model. In one embodiment, as illustrated in FIG. 2A, such model 200 includes a manageability extension layer 202, a manageability abstraction layer 204, and a managed resource layer 206.

As will be illustrated below in the context of FIG. 2B, the manageability extension layer includes node agent software code that resides on a managed resource tier for receiving control and configuration commands for a managed resource from an application server tier (managing tier). The manageability abstraction layer includes software code for interacting with a management interface and thereby defining a service provider interface (SPI). The managed resource layer includes resource-specific software code for controlling a managed resource within the managed resource layer.

In one embodiment, the node agent code on the managed resource tier includes performance reporting code for sending performance information regarding the managed resource back to the application server tier. While the invention is not limited to any particular management environment, it is particularly well suited for use in a WebSphere™ Deployment Management environment (IBM Corporation of Armonk, N.Y.).

In accordance with a WebSphere™ environment, principles of the invention provide a cross-tier workload management methodology that is Java application server centric. For ease of explaining the concepts, we use a WebSphere™ application server (WAS) as the application tier and DB2™ (IBM Corporation of Armonk, N.Y.) as the backend tier. However, the concepts introduced herein can be easily applied to other application servers and other backend tiers.

Figure 2B:
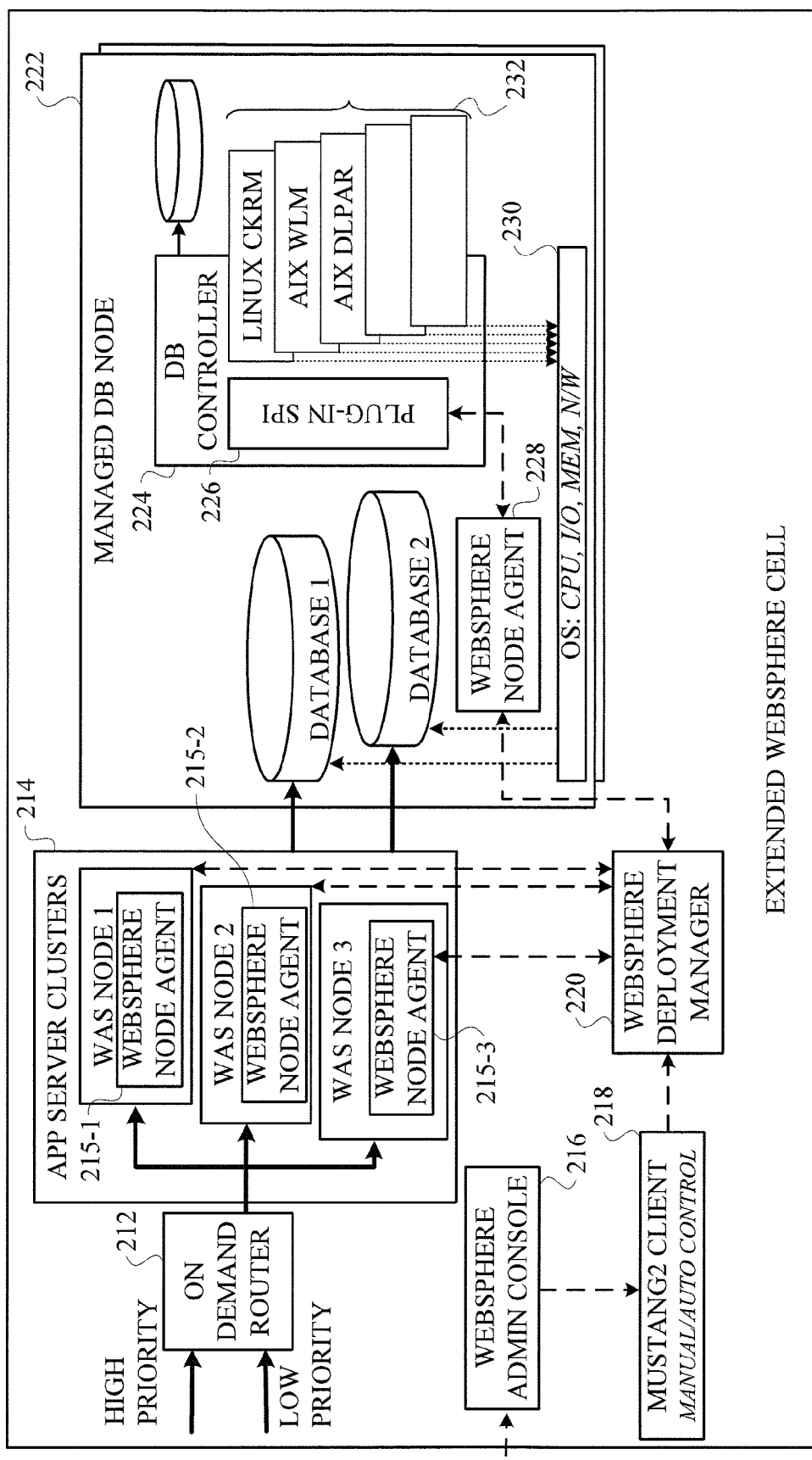
FIG. 2B illustrates a cross-tier management methodology for managing a database tier from an application server tier, according to an embodiment of the invention.

FIG. 2B illustrates a cross-tier management methodology according to an embodiment of the invention. In the context of FIG. 2B, we illustrate how model 200 can be applied to controlling a database server tier from an application server tier. The controlling entity is WebSphere™ Application Server (WAS) tier and the backend controlled tier is a database tier.

As shown, an extended WebSphere™ cell 210 includes an on demand router 212, an application server cluster 214 including WAS nodes 1, 2 and 3 with respective node agents 215-1, 215-2, and 215-3, administrator console 216, client 218, and deployment manager 220. Cell 210 also includes managed database (DB) node 222 including database 1, database 2, DB controller 224, plug-in SPI 226, node agent 228, operating system 230, and plug-ins 232.

In general, a request enters the cell at router 212 and is routed to a particular WAS node in the server cluster 214. The WAS node that handles the request may be selected based on the priority of the request (e.g., high priority requests going to WAS nodes 1 or, and low priority requests going to WAS node 3). Depending on the nature of the request, the WAS node may require assistance of a database server node (e.g., Database 1 or Database 2) in order to respond to the request. Again, the database server node may be selected based on the priority associated with the request.

Typically, WebSphere™ node agents (i.e., 215-1 through 215-3) are used as management (configuration and control) servers between WAS nodes and the WebSphere™ deployment manager 220 in a WebSphere extended deployment or network deployment setup. Note that block 216 is a user interface where a system administrator sets management goals and parameters. Block 218 represents software code that executes management functions.

In accordance with illustrative principles of the invention, the WebSphere™ node agent is extended for other non-application tiers (e.g., the managed DB tier, the storage systems, etc.). Such extension is realized in cell 210 of FIG. 2B by node agent 228, located in managed DB node 222. This is considered the manageability extension layer (202 of FIG. 2A) of the cross-tier management model of the invention.

It is to be understood that while FIG. 2B illustrates the application server (WAS) tier managing the database (DB) tier, we can place node agents in other tiers with non-identical functions to facilitate distributed administration and workload management beyond WAS instances. For example, besides the WAS tier and the DB tier, suppose we have a third tier, e.g., a storage tier, as well. Hence, the management infrastructure is as follows. WAS is the managing server with respect to DB, the managed resource, and thus WAS puts agent code in the DB tier. Similarly, DB is the managing server with respect to storage, the managed resource, and thus DB puts agent code in the storage tier.

Returning to the embodiment of FIG. 2B, the placement of node agent 228 on the database node 222 allows the database to be managed from the application server tier. This node agent 228 can receive any control and configuration commands for different databases thereon from the application tier via deployment manager 220. Node agent 228 can also send back any performance related information of the databases back to the application tier.

The management extensions to the node agent provide an abstract interface, to a controlling entity such as the Web-Sphere™ Deployment manager 220, independent of the underlying virtualization technologies such as OS WLM (e.g., Linux CKRM, AIX WLM, HP-UX WLM, Solaris Resource Manager) and partitioning technologies such as dynamic LPAR, Linux Xen, Meiosys Metacluster, etc. CKRM refers to class-based kernel resource management (http://ckrm.sourceforge.net/), AIX WLM refers to a workload management system (http://www.redboods,ibm.com/abstracts/sg245977.html), dynamic LPAR refers to dynamic logical partitions (http://www-03.ibm.com/servers/eserver/iseries/1par/) and Linux Xen is described at http://kerneltrap.org/node/4168. These are only examples of plug-ins that may be used in the WebSphere™ cell.

The implementation of this interface may be based on open standards such as Java Management Extensions or Web Services Distributed Management (WS-DM).

As shown in FIG. 2B, DB controller 224 provides abstraction from platform specific workload management capability. This is considered the manageability abstraction layer (204 of FIG. 2A) of the cross-tier management model of the invention. DB controller 224 defines a Service Provider Interface (SPI) 226 that is implemented by the managed resource layer (206 of FIG. 2A). The manageability abstraction layer contains the logic to interact with any management infrastructure such as JMX or WS-DM. JMX: Java Management Extensions are described at http://java.sun.com/products/JavaManagement/, and WS-DM: Web Services Distributed Management is described at (www.oasis-open.org/committees/wsdm/).

In the case of WebSphere, the preferred management protocol is JMX. This layer also has the processing capability to determine which plug-in of the managed resource layer has to be invoked to achieve control.

Furthermore, the abstraction layer is the layer that serves to hide the implementation details of the resource so that an entity (e.g., system administrator or processing node) that requests some action need only request the action without needing to know how the action is accomplished. For example, if an entity wants to increase the CPU share 10% for an application, it only needs to issue a generic command such as "increase CPU 10%." The abstraction layer translates this command into an executable command according to the respective grammar understood by the different resources, i.e., since the actual command for plug-in Linux CKRM would be different than the actual command for plug-in AIX WLM.

The managed resource layer contains the implementation of technology specific "glue code" to provide the actual control logic (the glue code refers to the actual command understood by the plug-in). That is, the managed layer contains the resource specific logic to implement the actual control. In FIG. 2B, plug-ins 232 define this layer. The control of the DB tier resources (230) can be achieved using various options such as Linux CKRM, AIX WLM, dynamic LPAR, or DB2 WLM.

An example of configuration and control could be creating classes for the various database instances in the OS WLM and then creating rules for classifying the processes belonging to these instances into the proper class and applying the proper amount of resource (CPU, IO, memory) shares to the classes based on a request from the controlling entity.

Again, it is to be understood that while FIG. 2B illustrates management of a second tier (database server tier) from a first tier (application server tier), the management model of FIG. 2A may be applied to three or more tiers of a computing system. That is, principles of the invention may be used to manage end-to-end goals in a system that includes three or more tiers whereby work progressively flows from a first tier to a second tier and subsequently from the second tier to the third tier, and so on to other subsequent tiers. For example, the first tier manages the second tier and the second tier manages the third tier and so on. Such tier-to-tier management is achieved by employing management translation layers that allow the higher-level tier to communicate directives (commands) to the lower-level tier. The lower level tier converts/accepts these directives into its own/native management capability.

Figure 3:
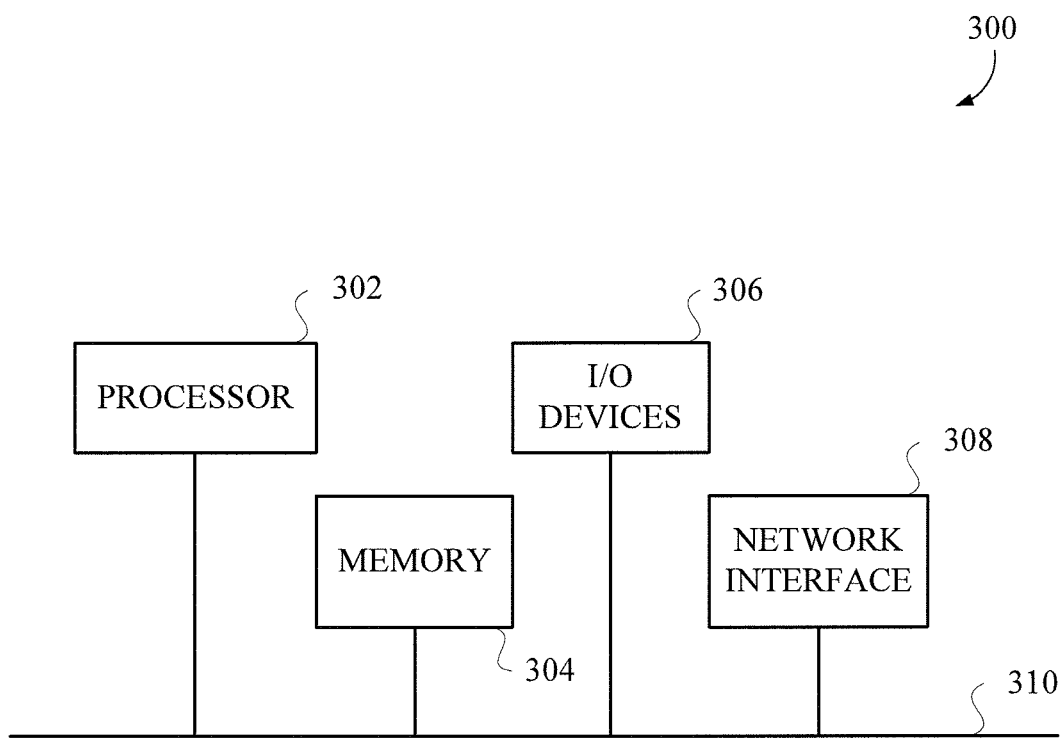
FIG. 3 illustrates a computer system wherein cross-tier management techniques may be implemented, according to an embodiment of the invention.

FIG. 3 is a block diagram illustrating an illustrative hardware implementation of a computer system in accordance with which one or more components/steps of a management system (e.g., components/steps described in the context of FIGS. 1, 2A, and 2B) may be implemented, according to an embodiment of the present invention. For example, the illustrative architecture of FIG. 3 may be used in implementing any and all of the components (i.e., nodes, node agents, database servers, deployment manager, DB controller, plug-ins, etc.) of any of the tiers shown in FIGS. 1, 2A, and 2B.

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 300 may be implemented in accordance with a processor 302, a memory 304, I/O devices 306, and a network interface 308, coupled via a computer bus 310 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also comprises techniques for providing cross-tier management services.

By way of example, a service provider agrees (e.g., via a service level agreement or some informal agreement or arrangement) with a service customer to provide cross-tier management services. That is, by way of one example only, the service provider may host the customer's web site and associated applications (e.g., e-commerce applications). Then, in accordance with terms of the contract between the service provider and the service customer, the service provider provides cross-tier management services which may comprise one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for managing a computing system, wherein the computing system comprises a first tier and at least a second tier, wherein the first tier and the second tier are configured to respond to a request received by the computing system, the method comprising the steps of:
   monitoring performance of the second tier from the first tier; and
   sending one or more management commands from the first tier to the second tier based on the monitored performance;
   wherein the second tier comprises: a node agent for receiving the one or more management commands comprising at least one of a control command and a configuration command, such that management control in the first tier extends to the second tier; and an interface for abstracting the one or more management commands with respect to one or more provider-specific resource management plug-in modules;
   wherein the first tier and the second tier share a management model comprising a manageability extension layer for receiving control and configuration commands for a managed resource, a manageability abstraction layer for hiding one or more details of the managed resource such that the request received by the computing system may specify only a given action, and a managed resource layer comprising resource specific logic for implementing actual control logic;
   wherein the monitoring step and the sending step are implemented via one or more software components which are loaded from a memory and executed by a processing device coupled to the memory; and
   wherein the node agent comprises a management component operative to: create one or more classes for one or more instances of at least one data resource; classify one or more processes belonging to the one or more instances into at least one of the one or more classes; and apply respective amounts of one or more shared system resources to the one or more classes in accordance with the generic command.

2. The method of claim 1, further comprising:
   sending performance data from the node agent of the second tier to the first tier.

3. The method of claim 1, wherein the first tier comprises an application server tier of the computing system and wherein the second tier comprises a database server tier of the computing system.

4. The method of claim 1, wherein the first tier comprises a database tier of the computing system and wherein the second tier comprises a storage tier of the computing system.

5. The method of claim 1, further comprising the step of the first tier installing the node agent onto the second tier.

6. The method of claim 1, wherein the computing system further comprises a third tier, and wherein the method further comprises the step of the second tier installing the node agent onto the third tier.

7. The method of claim 6, wherein the first tier comprises an application server tier of the computing system, wherein the second tier comprises a database server tier of the computing system, and wherein the third tier comprises a storage tier of the computing system.

8. The method of claim 1, wherein the first tier comprises a management server.

9. The method of claim 8, wherein the management server is extended for the second tier by the node agent.

10. The method of claim 8, wherein the computing system further comprises a deployment server coupled to a user interface.

11. The method of claim 10, wherein the step of sending the one or more management commands from the first tier to the second tier further comprises the steps of:
    sending the one or more management commands from the management server of the first tier to the deployment server; and
    sending the one or more one or more management commands from the deployment server to the node agent of the second tier.

12. The method of claim 1, wherein the interface is further operative to determine at least one of the one or more plug-in modules to be invoked in order to implement the one or more management commands.

13. A method for managing one or more goals in a system that comprises two or more tiers, whereby work progressively flows from tier-to-tier of the system, the method comprising the steps of:
    communicating one or more generic commands from a higher-level tier to a lower-level tier, the one or more generic commands comprising at least one of a control command and a configuration command; and
    converting the one or more generic commands at the lower-level tier into executable instructions specific to a management component of the lower-level tier and operative to effect the one or more system goals;

wherein the communicating step and the converting step are implemented via one or more software components which are loaded from one or more memories and executed by one or more processing devices coupled to the one or more memories;

wherein the higher-level tier and the lower-level tier share a management model comprising a manageability extension layer for receiving control and configuration commands for a managed resource, a manageability abstraction layer for hiding one or more details of the managed resource such that the request received by the computing system may specify only a given action, and a managed resource layer comprising resource specific logic for implementing actual control logic; and wherein the management component is operative perform steps comprising:

creating one or more classes for one or more instances of at least one data resource;

classifying one or more processes belonging to the one or more instances into at least one of the one or more classes; and applying respective amounts of one or more shared system resources to the one or more classes in accordance with the generic command.

14. The method of claim 13, wherein work progressively flows from a first tier to a second tier and subsequently from the second tier to at least a third tier.

15. The method of claim 14, wherein the communicating step and the converting step further comprise:

communicating one or more generic commands from the first tier to the second tier; and converting the one or more generic commands at the second tier into executable instructions specific to a management component of the second tier.

16. The method of claim 15, wherein the communicating step and the converting step further comprise:

communicating one or more generic commands from the second tier to the third tier; and converting the one or more generic commands at the third tier into executable instructions specific to a management component of the third tier.

17. The method of claim 13, wherein the executable instructions are according to a grammar specific to the management component.

18. A computing system configured to respond to a request received by the computing system, the computing system comprising:

a first tier comprising at least a first processor coupled to at least a first memory; and a second tier comprising at least a first processor coupled to at least a second memory;

wherein the first tier is operative to monitor performance of a second tier and to send one or more management commands from the first tier to the second tier based on the monitored performance;

wherein the second tier comprises: a node agent for receiving the one or more management commands comprising at least one of a control command and a configuration command, such that management control in the first tier extends to the second tier; and an interface for abstracting the one or more management commands with respect to one or more provider-specific resource management plug-in modules; and wherein the first tier and the second tier share a management model comprising a manageability extension layer for receiving control and configuration commands for a managed resource, a manageability abstraction layer for hiding one or more details of the managed resource such that the request received by the computing system may specify only a given action, and a managed resource layer comprising resource specific logic for implementing actual control logic wherein the node agent comprises a management component operative to: create one or more classes for one or more instances of at least one data resource; classify one or more processes belonging to the one or more instances into at least one of the one or more classes; and apply respective amounts of one or more shared system resources to the one or more classes in accordance with the generic command.

19. The method of claim 18, wherein the first tier comprises an application server tier of the computing system and wherein the second tier comprises a database server tier of the computing system.

* * * * *